United States Patent
Lee et al.

(10) Patent No.: US 10,156,949 B2
(45) Date of Patent: Dec. 18, 2018

(54) FORCE-TOUCH SENSOR WITH MULTILAYERED ELECTRODES

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 101 days.

(21) Appl. No.: 15/416,126

(22) Filed: Jan. 26, 2017

(65) Prior Publication Data

US 2017/0228065 A1    Aug. 10, 2017

(30) Foreign Application Priority Data

Feb. 5, 2016    (TW) .............................. 105103973 A (51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04105* (2013.01); *G06F 2203/04106* (2013.01); *G06F 2203/04107* (2013.01)

(58) Field of Classification Search
CPC ........ G06F 3/041; G06F 3/0412; G06F 3/044; G06F 2203/04105; G06F 2203/04106;
(Continued)

(56) References Cited

U.S. PATENT DOCUMENTS 5,942,733 A * 8/1999 Allen ................. G06K 9/00335
178/18.01
6,002,389 A * 12/1999 Kasser .................... G06F 3/041
178/18.01
(Continued)

FOREIGN PATENT DOCUMENTS

CN    104897317 A  *  9/2015
CN    205015877 U  *  2/2016
(Continued)

OTHER PUBLICATIONS

English translation of Taiwan office action dated Sep. 10, 2016.*

*Primary Examiner* — Julie Anne Watko
(74) *Attorney, Agent, or Firm* — Chun-Ming Shih; HDLS IPR Services (57) ABSTRACT

A force-touch sensor with multilayered electrodes includes an upper substrate, a first electrode layer arranged on one face of the upper substrate and having a plurality of first sensing electrodes, a second electrode layer arranged opposite to the first electrode layer and having a plurality of second sensing electrodes, each second sensing electrode being electrically connected with one corresponding first sensing electrode to constitute a touch-sensing electrode, a plurality of touching sensing traces, each electrically connected with one touch-sensing electrode and electrically isolated with other touch-sensing electrodes, a resilient dielectric layer arranged on one face of the second electrode layer and opposite to the upper substrate, and a third electrode layer arranged on the resilient dielectric layer and having at least one force-sensing electrode. The force-touch sensor with has enhanced performance due to the multilayered electrodes structure.

15 Claims, 9 Drawing Sheets

(58) Field of Classification Search
CPC .... G06F 2203/04107; G06F 3/03; G06F 3/01; G06F 3/00; G06F 3/0414
See application file for complete search history.

(56) References Cited

U.S. PATENT DOCUMENTS

| | | | |
|---|---|---|---|
| 8,627,716 B2* | 1/2014 | Son | G06F 3/044 73/172 |
| 2007/0257821 A1* | 11/2007 | Son | G06F 3/016 341/22 |
| 2011/0080373 A1* | 4/2011 | Wang | G06F 3/044 345/174 |
| 2014/0062933 A1* | 3/2014 | Coulson | G06F 3/044 345/174 |
| 2014/0238152 A1* | 8/2014 | Kallassi | G01R 27/2605 73/862.626 |
| 2015/0130742 A1* | 5/2015 | Chen | G06F 3/044 345/174 |
| 2015/0277626 A1* | 10/2015 | Shinkai | G06F 3/044 345/174 |
| 2016/0077648 A1* | 3/2016 | Hsieh | G06F 3/0414 345/174 |
| 2017/0205930 A1* | 7/2017 | Lee | G06F 3/0414 |
| 2017/0269773 A1* | 9/2017 | Suzuki | G06F 3/0416 |

FOREIGN PATENT DOCUMENTS

| | | | |
|---|---|---|---|
| TW | 201305879 A | * | 2/2013 |
| TW | M522414 U | * | 5/2016 |

* cited by examiner

FORCE-TOUCH SENSOR WITH MULTILAYERED ELECTRODES

BACKGROUND OF THE INVENTION

Field of the Invention

The present invention relates to a sensor, especially to a force-touch sensor with multilayered electrodes.

Description of Prior Art

The touch display panels become popular as the market growing of the compact and lightweight mobile device. The pressure touch control technology has rapid development owing to the maturity of touch-control user interface and serious demand for 3D touch operation. Meanwhile, the broad application of robot in industry is gradually extending to office, hospital and family, and resulting in the rapid increase of need for human touch device. The conventional pressure touch control panel generally integrates microelectromechanical sensor at edge or corner of the display panel to sense tactile pressure on the display panel, or locates a plurality of force sensors of micro mechanic in artificial skin of robot for touch and force sensing. The cost of the sensor is high and the assembling of the sensor is difficult. Besides, artificial skin including conductive rubber, conductive sponge, or carbon fiber can detect the force and variation of resistance by measuring variation of current, but the power consuming is high and accuracy is not good, both of this artificial skin and the aforementioned one cannot sense the proximity of object, thus it still needs lots of effort to improve the pressure touch control panel and human tactile-proximity device.

SUMMARY OF THE INVENTION

It is an object to provide a force-touch sensor with multilayered electrodes to increase the precision of force sensing.

Accordingly, the present invention provides a force-touch sensor with multilayered electrodes including: an upper substrate, the upper substrate having a first face and a second face opposite to the first face; a first electrode layer arranged on one face of the upper substrate, the first electrode layer having a plurality of first sensing electrode; a second electrode layer arranged opposite to the first electrode layer, and farther away from the upper substrate than the first electrode layer, having a plurality of second sensing electrodes, each second sensing electrode corresponding to each of the first sensing electrodes, and being electrically connected with one corresponding first sensing electrode to form a plurality of touch sensing electrode; a plurality of touch electrode traces, each touch electrode trace being electrically connected with one corresponding touch sensing electrode and electrically isolated with other touch sensing electrodes; a resilient dielectric layer arranged on a side of the second electrode layer, the side being opposite to the upper substrate, and the resilient dielectric layer being compressively deformed under pressure, and being restoring to original shape and volume if pressure is not present; and a third electrode layer arranged on a side of the resilient dielectric layer, the side being opposite to the upper substrate, the third electrode layer having at least one force sensing electrode.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1A:
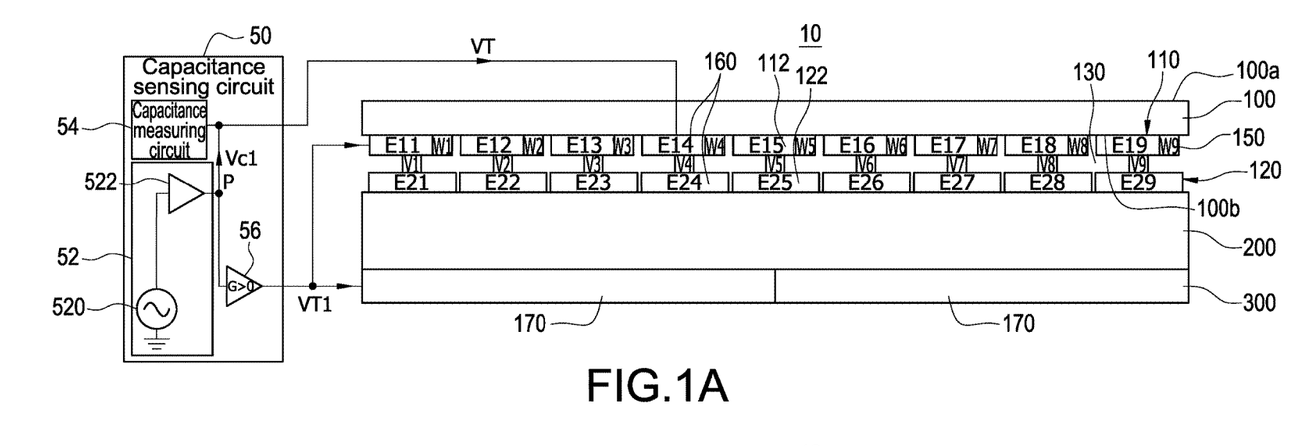
FIG. 1A shows a schematic view of the force-touch sensor with multilayered electrodes according to an embodiment of the present invention.

FIG. 1A shows a schematic view of the force-touch sensor with multilayered electrodes according to an embodiment of the present invention. A force-touch sensor 10 with multi-layered electrode (hereinafter the force-touch sensor 10) includes, from top to bottom and the up direction corresponding to the touch point of user finger or touch pen, an upper substrate 100, a first electrode layer 110, a second electrode layer 120, an isolated layer 130, a resilient dielectric layer 200, and a third electrode layer 300. The force-touch sensor 10 further includes a plurality of touch electrode traces 150 arranged between the upper substrate 100 and the resilient dielectric layer 200. The upper substrate 100 has a first face 100a and a second face 100b opposite to the first face, the first electrode layer 110 is arranged on a face of the upper substrate 100 (for example, the second face 100b in the embodiment), and the first electrode layer 110 includes a plurality of first sensing electrodes 112, such as the first sensing electrodes E11-E19 shown in FIG. 1A. It should be noted that this is only a sectional view, the number and distribution of the first sensing electrodes are not limited here. The second electrode layer 120 is arranged on a side of the first electrode layer 110, the side is opposite to the upper substrate 100, that is, the second electrode layer 120 is farther away from the upper substrate 100 than the first electrode layer 110. The second electrode layer 120 includes a plurality of second sensing electrodes 122; each of the second sensing electrodes 122 corresponds to each of the first sensing electrodes 112, and is electrically connected with the corresponding first sensing electrode 112 to form a plurality of touch sensing electrodes 160. The isolated layer 130 is arranged between the first electrode layer 110 and the second electrode layer 120. In other word, the second sensing electrodes 122 are connected with the corresponding first sensing electrodes 112 via the interlayer connection electrodes V1-V9 in the isolated layer 130.

The touch electrode traces 150 (W1-W9) corresponds to and is connected with a touch sensing electrode 160, and is isolated with other touch sensing electrodes. In the embodiment, the touch electrode traces 150 is coplanar with the first sensing electrode 112 and shielded by the second sensing electrodes from projection view (seen from the top view of the force-touch sensor 10). When force sensing is performed to the force-touch sensor 10, the first sensing electrode 112 can effectively shield charge interference from finger, and increase the precision of force sensing. The resilient dielectric layer 200 is compressively deformed with pressure, and restores to original volume and shape when the pressure is not present. The third electrode layer 300 is arranged on a side of the resilient dielectric layer 200, the side is opposite to the upper substrate 100, the third electrode layer 300 includes at least one force sensing electrode 170 (for example, the third electrode layer 300 having two force sensing electrodes 170 in FIG. 1A). In the following embodiments, the corresponding drawings do not show detailed structure of the third electrode layer 300 for simplification, but the third electrode layer 300 includes at least one force sensing electrode 170. Besides, the force-touch sensor 10 further includes a capacitance sensing circuit 50; the capacitance sensing circuit 50 includes a capacitance excitation driving circuit 52 and a capacitance measuring circuit 54.

Please refer to FIG. 1A again, for the description of the operation of touch sensing of the force-touch sensor 10. The capacitance excitation driving circuit 52 includes a signal source 520 and a driving unit 522, and sends a touch capacitance-excitation signal (stimulus signal) VT to a selected touch sensing electrode 160 (for example, the first sensing electrode E14 and the second sensing electrode E24) sequentially or randomly. Besides, the capacitance excitation driving circuit 52 sends the touch capacitance-excitation signal VT to an non-inverting amplifier 56, a gain of the non-inverting amplifier 56 is preferred to be 1 to generate an auxiliary signal VT1 with phase same as that of the touch capacitance-excitation signal VT, the auxiliary signal VT1 is sent to at least one corresponding force sensing electrode 170. Because the signal with phase same with that of the touch capacitance-excitation signal VT is applied to at least one corresponding force sensing electrode 170, equivalently, there is only minute (or even no) voltage difference generated between the corresponding selected touch sensing electrode 160 (E14,E24) and at least one corresponding force sensing electrode 170. In other word, there is only minute capacitance or no capacitance generated (minute capacitance not affecting the touch sensing result), thus capacitance interference caused by the warped resilient dielectric layer 200 under pressure is prevented, and interference resulting from the parallel capacitance effect between the force sensing electrode 170 and the grounding point is eliminated when sensing the touch operation of the corresponding selected touch sensing electrode 160.

Similarly, the auxiliary signal VT1 can also be sent to all touch sensing electrodes 160 around the selected touch sensing electrodes 160 (E14, E24) to eliminate the stray capacitance effect between the selected touch sensing electrode and the surrounding touch sensing electrodes, and concentrate electric field lines on the selected touch sensing electrode, thus increasing the sensitivity of proximity sensing.

Furthermore, in the present invention, tactile sensing includes touching sensing of user finger actually in contact with the upper substrate 100, and proximity sensing of user finger close to the upper substrate 100. When the user finger is actually in contact with the force-touch sensor 10 or gets close to the force-touch sensor 10, the relative capacitances of the first sensing electrodes in the force-touch sensor 10 are influenced, the contact or approaching of user finger with respect to the force-touch sensor 10 can be sensed by sensing the capacitance. In the following description, the tactile sensing includes both touch sensing and proximity sensing.

With the force-touch sensor 10 in FIG. 1A, the auxiliary signal VT1 can be used to decrease or eliminate the influence of warp or deformation of the resilient dielectric layer 200. After the capacitance excitation driving circuit 52 of the capacitance sensing circuit 50 sends the touch capacitance-excitation signal VT to the selected touch sensing electrode 160, the capacitance measuring circuit 54 of the capacitance sensing circuit 50 can measure the tactile sensing signal Vc1 at sensing point P, then the touch location can be determined precisely.

Figure 1B:
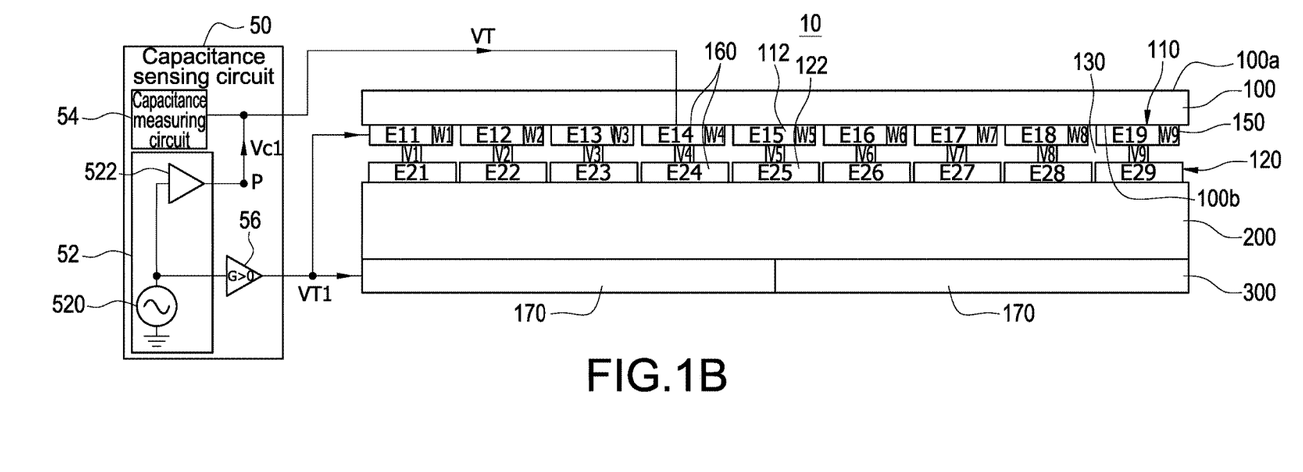
FIG. 1B shows a schematic view of the force-touch sensor with multilayered electrodes according to another embodiment of the present invention.

FIG. 1B shows a schematic view of the force-touch sensor with multilayered electrodes according to another embodiment of the present invention, a schematic view of operation of tactile sensing of the force-touch sensor 10 with multilayered electrodes (hereinafter the force-touch sensor 10). The embodiment in FIG. 1B is similar to that in FIG. 1A, the capacitance excitation driving circuit 52 in the embodiment directly sends the signal source 520 to a non-inverting amplifier 56 (bypassing a driving unit 522), a gain of the non-inverting amplifier 56 is preferred to be 1 to generate an auxiliary signal VT1 with phase same with that of the touch capacitance-excitation signal VT. Because the sensing point P and the auxiliary signal VT1 are separated in the embodiment, the sensing result is not influenced by the auxiliary signal VT1. Similarly, the auxiliary signal VT1 can be used to decrease or eliminate the influence of warp or deformation of the resilient dielectric layer 200. After the capacitance excitation driving circuit 52 of the capacitance sensing circuit 50 sends the touch capacitance-excitation signal VT to the selected touch sensing electrode 160 (E14,E24), the capacitance measuring circuit 54 of the capacitance sensing circuit 50 can measure the tactile sensing signal Vc1 at sensing point P, then the touch location can be determined precisely.

Figure 2A:
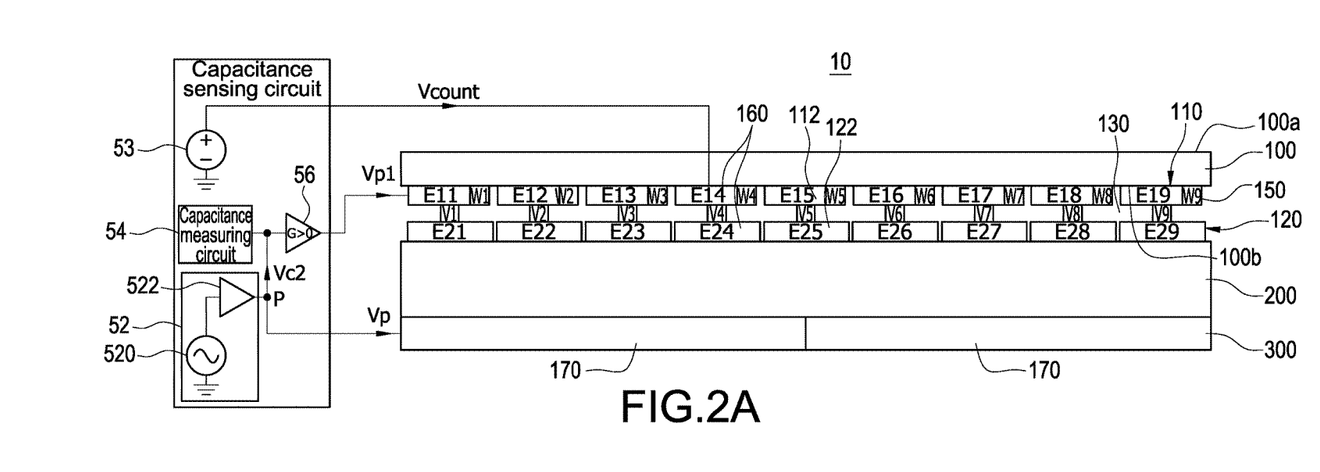
FIG. 2A shows a schematic view of the force-touch sensor with multilayered electrodes according to another embodiment of the present invention.

FIG. 2A shows a schematic view of the force-touch sensor with multilayered electrodes according to another embodiment of the present invention. When the force-touch sensor 10 is used to perform force sensing, the capacitance excitation driving circuit 52 sends force capacitance-excitation signal Vp to the force sensing electrode 170 of the third electrode layer 300, and sends a shielding signal Vp1 with phase same as that of the force capacitance-excitation signal Vp to the non-selected touch sensing electrode 160 (that is, at least part of the first sensing electrodes other than the selected first sensing electrode E14, and at least part of the second sensing electrodes other than the corresponding second sensing electrode E24), to shield capacitance variation from finger operation and increase the precision of force sensing. Furthermore, the counter-exciting signal Vcount with a predetermined voltage level is sent to the selected touch sensing electrode 160 (E14, E24) to enhance the sensitivity of force sensing of the corresponding force sensing electrode 170. The capacitance measuring circuit 54 of the capacitance sensing circuit 50 can measure the force sensing signal Vc2 from the force sensing electrode 170 at a sensing point P, thus determining a touch event being present or not and the value of the force thereof precisely.

Figure 2B:
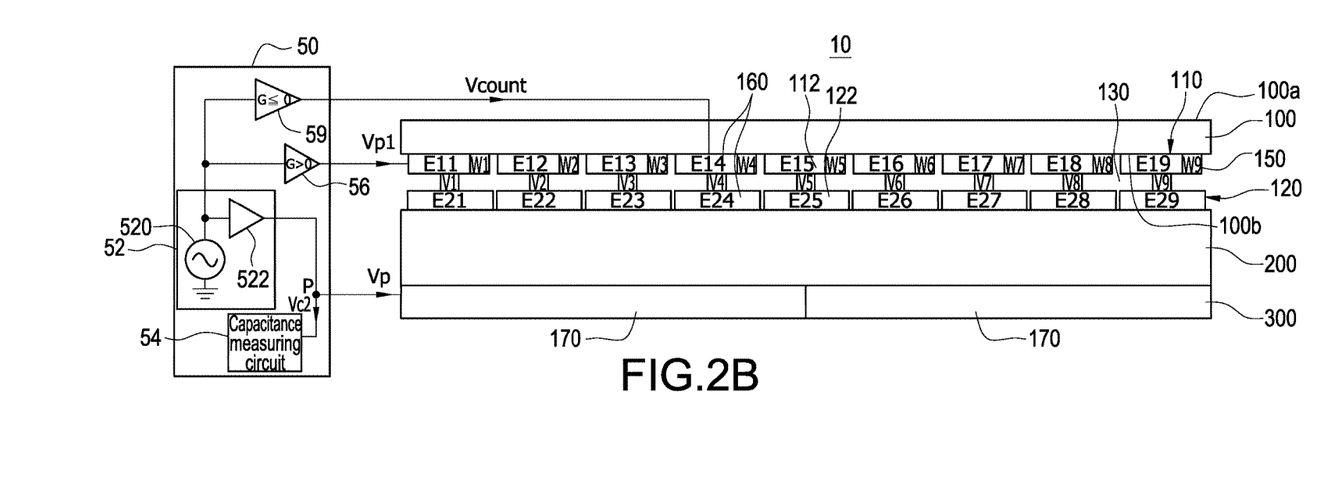
FIG. 2B shows a schematic view of the force-touch sensor with multilayered electrodes according to another embodiment of the present invention.

FIG. 2B shows a schematic view of the force-touch sensor with multilayered electrodes according to another embodiment of the present invention, and the force-touch sensor 10 is used for performing force sensing. The force-touch sensor 10 is similar to the embodiment shown in FIG. 2A, but the capacitance sensing circuit 50 in FIG. 2B has an inverting amplifier 59 to replace the dc reference signal source 53. In other word, the integrated touch and force sensor 10 of the embodiment generates a time varying signal with phase opposite to that of the force capacitance-excitation signal Vp by the inverting amplifier 59 and used as the counter-exciting signal Vcount. Similarly, the sensitivity of force sensing of the second sensing electrode can also be enhanced. Besides, in the embodiment, the non-inverting amplifier 56 in the capacitance sensing circuit 50 is used to generate the shielding signal Vp1, an input of the non-inverting amplifier 56 is not connected to an input point of the capacitance measuring circuit 54. For example, the input can be directly connected to the signal source 520 to avoid influence from the force sensing signal Vc2 at the input point of the capacitance measuring circuit 54.

Figures 3A, 3B:
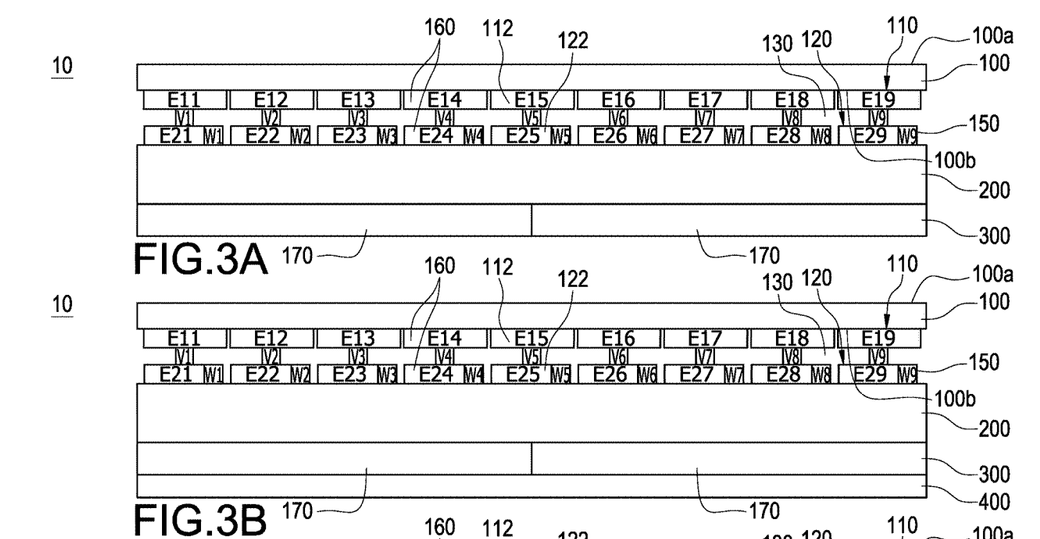
FIG. 3A shows a sectional view of the force-touch sensor with multilayered electrodes according to an embodiment of the present invention.
FIG. 3B shows a sectional view of the force-touch sensor with multilayered electrodes according to another embodiment of the present invention.
Figure 3C:
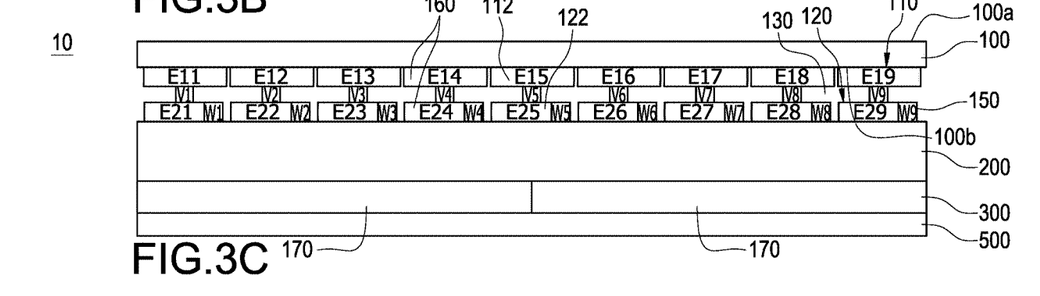
FIG. 3C shows a sectional view of the force-touch sensor with multilayered electrodes according to another embodiment of the present invention.

FIG. 3A shows a sectional view of the force-touch sensor with multilayered electrodes according to an embodiment of the present invention. The embodiment is similar to that shown in FIG. 1A, but in the embodiment, the touch electrode traces 150 are coplanar with the second sensing electrodes 122 and are electrically connected to the second sensing electrodes 122 one by one correspondingly, and shielded by the first sensing electrodes 112 on the projection respectively. The second sensing electrodes 122 are connected to the corresponding first sensing electrodes 112 via the interlayer connection electrodes V1-V9 in the isolated layer 130, and each of the second sensing electrodes 122 is electrically connected to a corresponding first sensing electrode 112, thus each touch electrode trace 150 can be electrically connected to the corresponding first sensing electrode 112. Similarly, because the touch electrode traces 150 are shielded by the first sensing electrode 112 on the projection, when the force-touch sensor 10 is performing force sensing, the first sensing electrode 112 can effectively shield the charge interference from finger and make the force sensing more precise. Please refer to FIG. 3B, FIG. 3B shows a sectional view of the force-touch sensor with multilayered electrodes according to another embodiment of the present invention, the force-touch sensor 10 is similar to that shown in FIG. 3A, the force-touch sensor 10 in FIG. 3B further includes a second substrate 400, the second substrate 400 is arranged on a side of the third electrode layer 300, the side is opposite to the dielectric layer 200. Please refer to FIG. 3C, FIG. 3C shows a sectional view of the force-touch sensor with multilayered electrodes according to another embodiment of the present invention, the force-touch sensor 10 is similar to that shown in FIG. 3B, the force-touch sensor 10 in FIG. 3C further includes an adhesive layer 500, the adhesive layer 500 is arranged on a side of the third electrode layer 300, the side is opposite to the upper substrate 100.

Figure 4A:
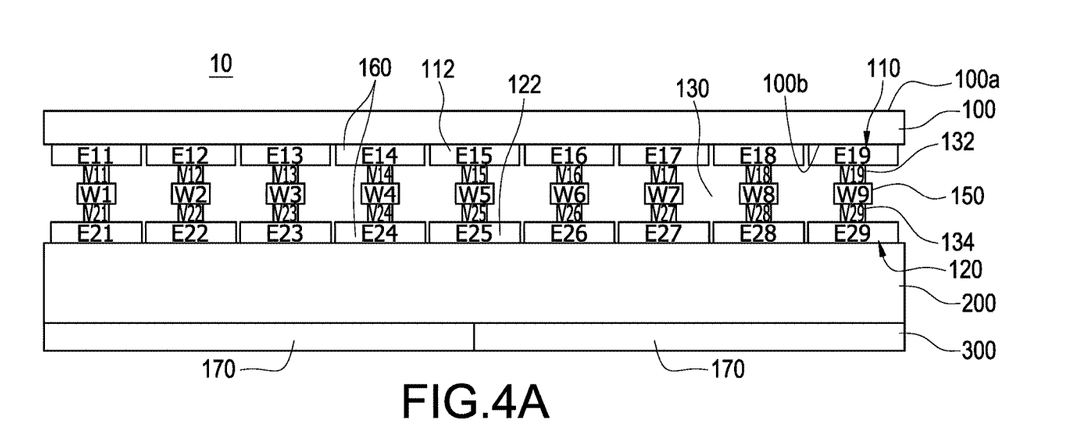
FIG. 4A shows a sectional view of the force-touch sensor with multilayered electrodes according to an embodiment of the present invention.
Figure 4B:
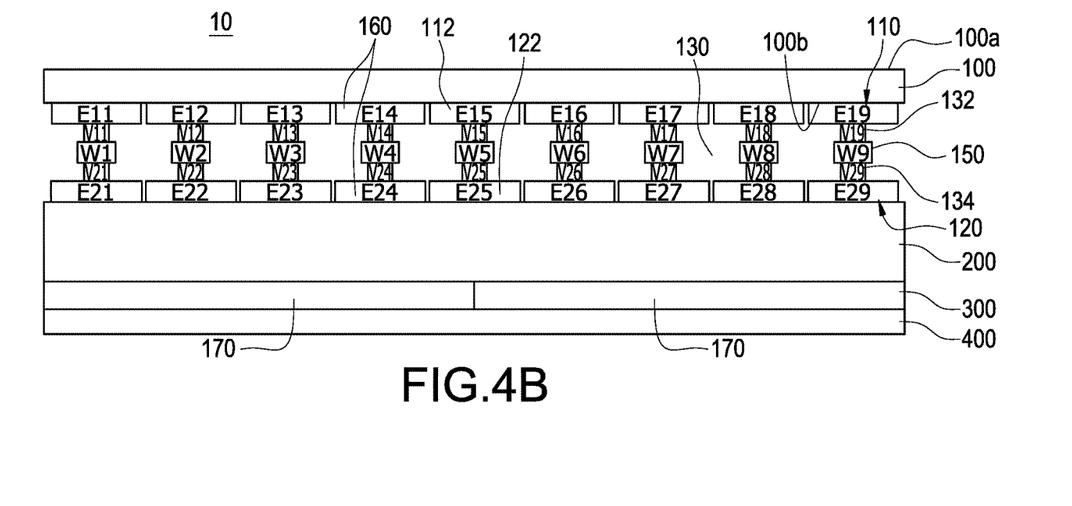
FIG. 4B shows a sectional view of the force-touch sensor with multilayered electrodes according to another embodiment of the present invention.
Figure 4C:
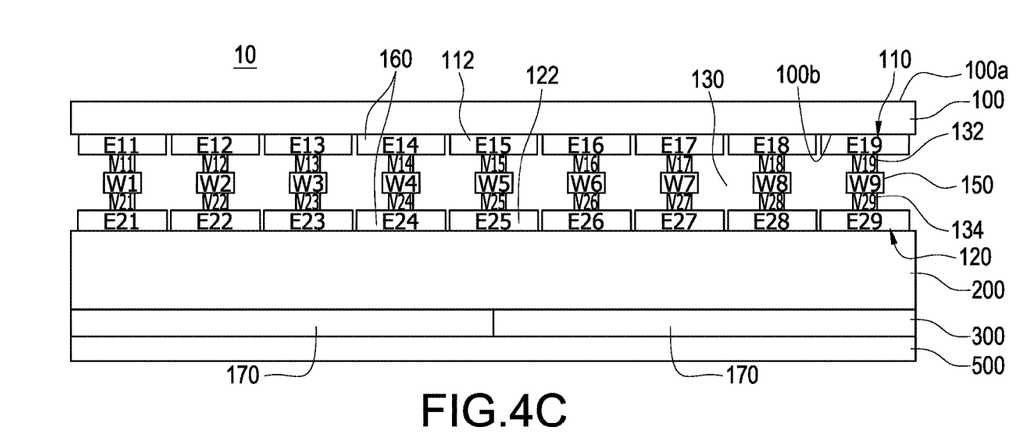
FIG. 4C shows a sectional view of the force-touch sensor with multilayered electrodes according to another embodiment of the present invention.

Please refer to FIG. 4A, FIG. 4A shows a sectional view of the force-touch sensor with multilayered electrodes according to an embodiment of the present invention. The embodiment is similar to that shown in FIG. 3A, in the embodiment, the touch electrode traces 150 are arranged between the first sensing electrode 112 and the second sensing electrode 122. In the isolated layer 130, each of the touch electrode traces 150 is electrically connected to a corresponding first sensing electrode 112 via the top first layer connection electrodes 132 (V11-V19), and is electrically connected to a corresponding second sensing electrode 122 via the bottom second layer connection electrodes 134 (V21-V29). The touch electrode traces 150 are shielded by the corresponding first sensing electrodes 112 and second sensing electrodes 122 from the projection view. The first sensing electrode 112 and the second sensing electrode 122 can effectively shield the charge interference from finger to make the force sensing more precise when the force-touch sensor 10 is performing force sensing. Please refer to FIG. 4B, FIG. 4B shows a sectional view of the force-touch sensor with multilayered electrodes according to another embodiment of the present invention, the force-touch sensor 10 is similar to that shown in FIG. 4A, the force-touch sensor 10 in FIG. 4B further includes a second substrate 400, the second substrate 400 is arranged on a side of the third electrode layer 300, the side is opposite to the dielectric layer 200. Please refer to FIG. 4C, FIG. 4C shows a sectional view of the force-touch sensor 10 according to another embodiment of the present invention, the force-touch sensor 10 is similar to that shown in FIG. 4B, the force-touch sensor 10 in FIG. 4C further includes an adhesive layer 500, the adhesive layer 500 is arranged on a side of the third electrode layer 300, the side is opposite to the upper substrate 100.

Figure 5A:
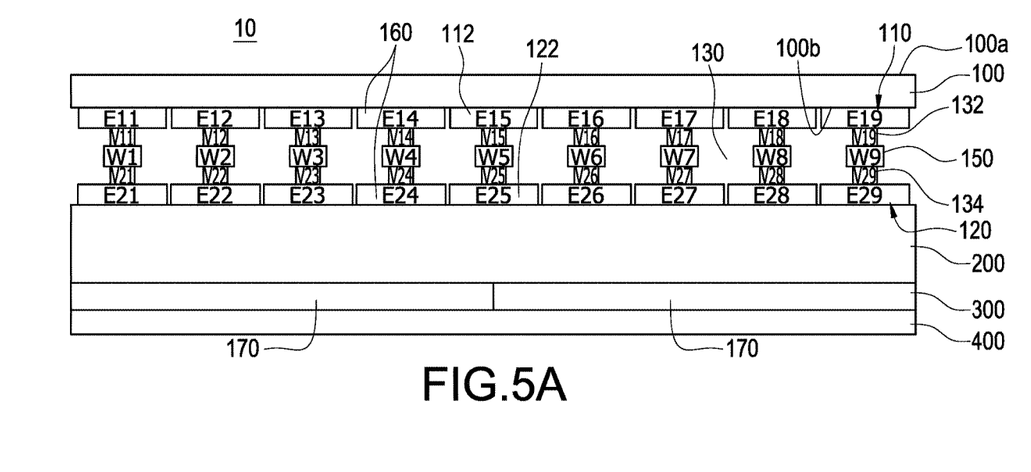
FIG. 5A shows a sectional view of the force-touch sensor with multilayered electrodes according to another embodiment of the present invention.
Figure 5B:
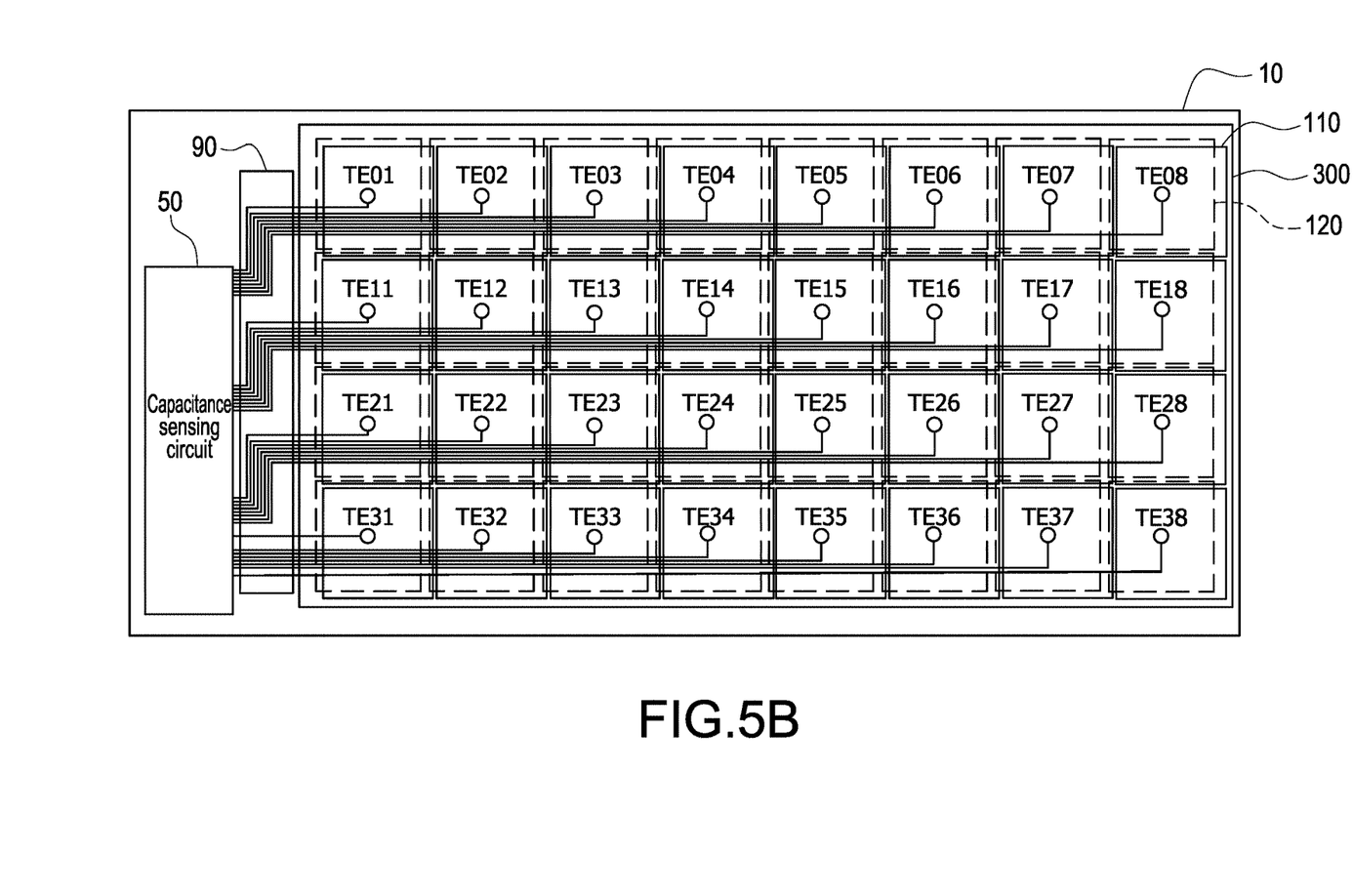
FIG. 5B shows a top view of the force-touch sensor with multilayered electrodes according to another embodiment of the present invention.

Please refer to FIG. 5A, FIG. 5A shows a sectional view of the force-touch sensor 10 according to another embodiment of the present invention, and mainly illustrates an overlapping sectional view of the first sensing electrode 112, the second sensing electrode 122, the isolated layer 130 and the touch electrode trace 150. FIG. 5B shows a top view of the force-touch sensor 10 according to another embodiment of the present invention, and mainly illustrates that the first sensing electrodes of the first electrode layer 110 are electrically connected to the second sensing electrode of the second electrode layer 120 one by one correspondingly to form a plurality of the touch sensing electrodes TE01-08, TE11-18, TE21-28, TE31-38. The touch electrode traces 150 are electrically connected to the capacitance sensing circuit 50 and the touch sensing electrodes. The force-touch sensor 10 further includes a trace shielding electrode 90, the trace shielding electrode 90 shields the touch electrode traces 150 to prevent from the degrade of measurement sensitivity, which is caused by the interference on the touch electrode traces 150.

Figure 6:
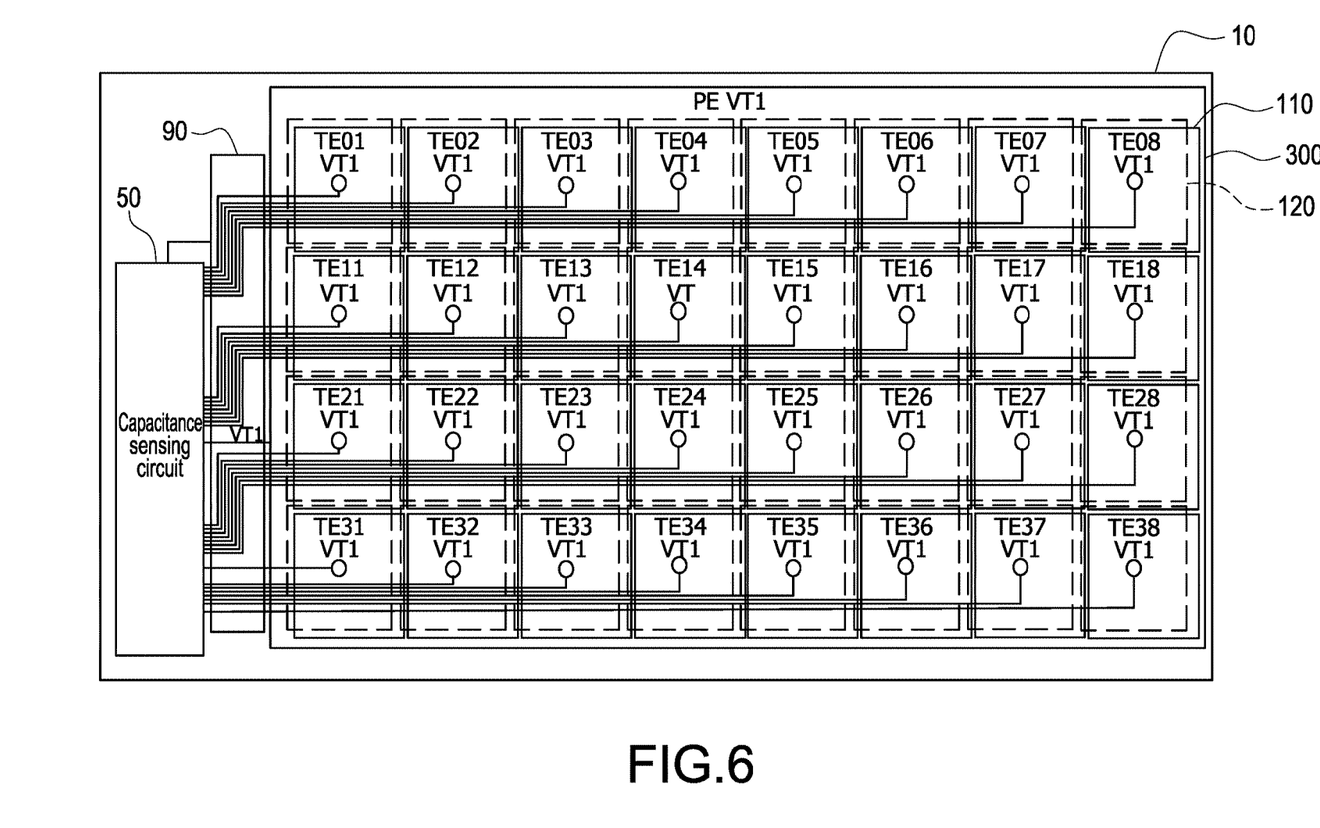
FIG. 6 shows a distribution diagram of touch operation signal of the force-touch sensor with multilayered electrodes according to another embodiment of the present invention.

FIG. 6 shows a distribution diagram of touch operation signal of the force-touch sensor with multilayered electrodes according to another embodiment of the present invention, and mainly illustrates the distribution of the touch capacitance-excitation signal VT and the auxiliary signal VT1 when the force-touch sensor 10 is performing touch sensing.

The first sensing electrodes of the first electrode layer 110 and the second sensing electrodes of the second electrode layer 120 are electrically connected with each other one by one correspondingly to form a plurality of touch sensing electrodes TE01-08, TE11-18, TE21-28, and TE31-38.

The capacitance sensing circuit 50 also processes the touch capacitance-excitation signal VT to generate the auxiliary signal VT1 with phase same as that of the touch capacitance-excitation signal VT, when the force-touch sensor 10 sends a touch capacitance-excitation signal VT to a selected touch sensing electrode TE14 sequentially or randomly. The auxiliary signal VT1 is sent to at least one corresponding force sensing electrode on the third electrode layer 300. Because the signal with phase same as that of the touch capacitance-excitation signal VT is sent to at least one corresponding force sensing electrode, equivalently, there is only minute (or even no) voltage difference between the corresponding selected touch sensing electrode TE14 and at least one corresponding force sensing electrode. In other word, there is no capacitance generated or only minute capacitance generated, the minute capacitance will not influence the touch sensing result, thus capacitance interference caused by warped resilient dielectric layer 200 under pressure is prevented, and interference resulting from the parallel capacitance effect between the force sensing electrode and the grounding point is eliminated when sensing the touch operation of the corresponding selected touch sensing electrode TE14. Similarly, the auxiliary signal VT1 can also be sent to all touch sensing electrodes around the selected touch sensing electrode TE14 to eliminate the stray capacitance effect between the selected touch sensing electrode TE14 and the surrounding touch sensing electrodes, and concentrate electric field lines on the selected touch sensing electrode, thus increasing the sensitivity of proximity sensing.

Figure 7:
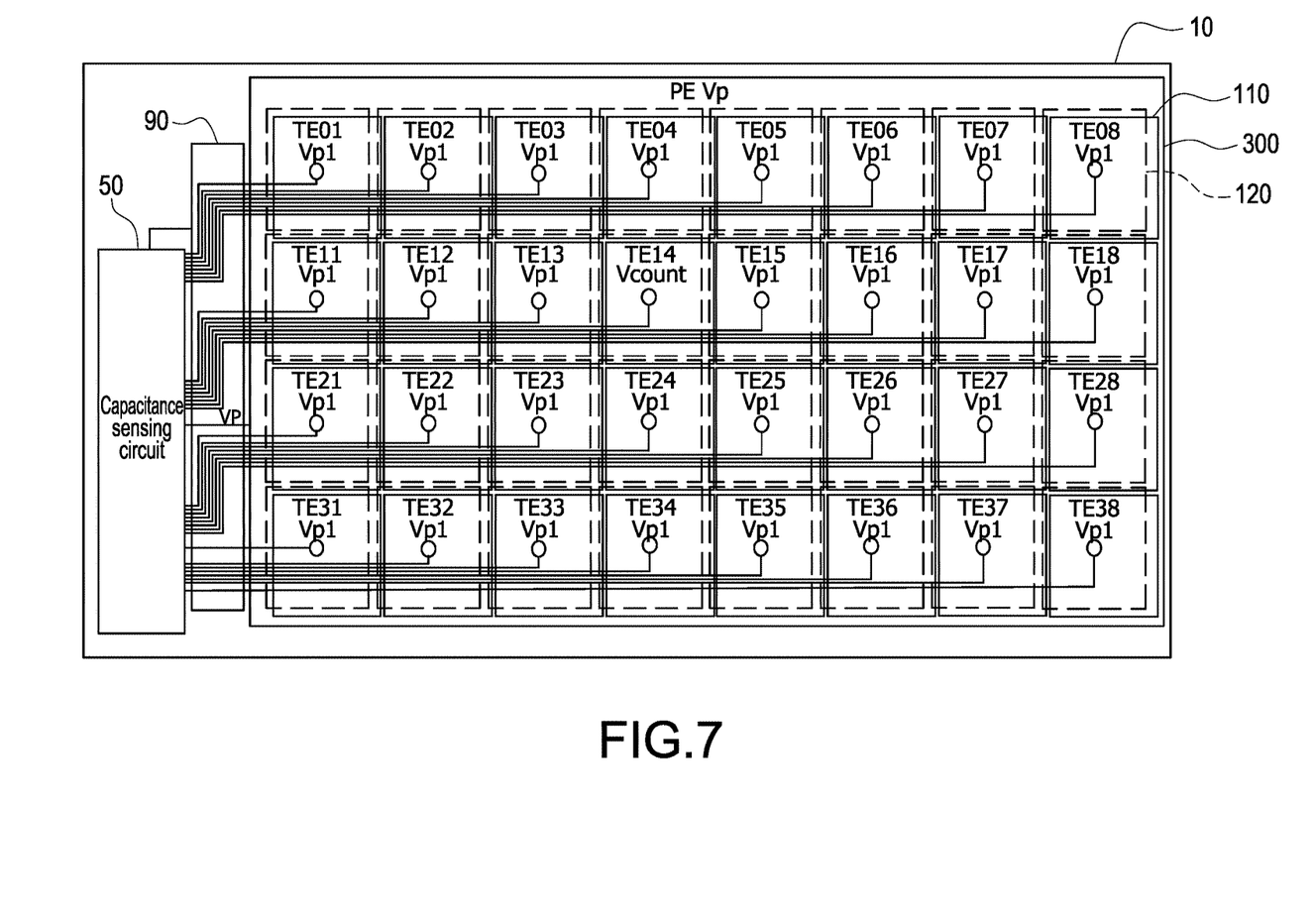
FIG. 7 shows a distribution diagram of force sensing signal of the force-touch sensor with multilayered electrodes according to another embodiment of the present invention.

FIG. 7 shows a distribution diagram of force sensing signal of the force-touch sensor 10 according to another embodiment of the present invention, and mainly illustrates the distribution of the force capacitance-excitation signal Vp and the shielding signal Vp1 when the force-touch sensor 10 is performing force sensing. The first sensing electrodes of the first electrode layer 110 and the second sensing electrodes of the second electrode layer 120 are connected with each other one by one correspondingly to form a plurality of touch sensing electrodes TE01-08, TE11-18, TE21-28, and TE31-38.

The capacitance sensing circuit 50 processes the force capacitance-excitation signal Vp through non-inverting amplification to generate the shielding signal Vp1 and sends the shielding signal Vp1 to non-selected force sensing electrode to shield capacitance variation from finger operation and increase the precision of force sensing, when the capacitance sensing circuit 50 sends the force capacitance-excitation signal Vp for performing force sensing to a corresponding selected force sensing electrode on the third electrode layer 300. Furthermore, sending a counter-exciting signal Vcount with a predetermined voltage level to the selected touch sensing electrode TE14 enhances the sensitivity of force sensing of the corresponding force sensing electrode and the precision of determining the force point.

It should be noted that in FIG. 5B, FIG. 6 and FIG. 7, the first sensing electrodes 112 and the second sensing electrodes 122 may be purposely offset with each other and overlapped with the corresponding electrodes of their adjacent sensing electrodes from projection view. Therefore, the third electrode layer 300 are covered by the touch sensing electrodes TE01-08, TE11-18, TE21-28, TE31-38, either along the projection view from operation point (upper position) to the third electrode layer 300 (lower position) or along the projection view from the third electrode layer 300 (lower position) to operation point (upper position), thus obtaining an optimal precision when performing force sensing.

In above embodiments, the upper substrate is a polymer thin film or an ultra-thin glass, the upper substrate is not thicker than 500 μm. The upper substrate is a flexible substrate and the upper substrate is not thicker than 500 μm. The lower substrate is a polymer thin film or a glass. The resilient dielectric layer 200 is arranged on a side of the second electrode layer, the side is opposite to the upper substrate, the resilient dielectric layer is arranged between the touch sensing electrodes 160 and the force sensing electrodes 170, and the touch sensing electrodes 160 and the force sensing electrodes 170 are parallel to each other. The resilient dielectric layer is compressively deformed with pressure, and restoring to original volume and shape when the pressure is not present. The resilient material can be, for example but not limited to, poly dimethyl siloxane (PDMS), optical clear adhesive (OCA). The touch capacitance-excitation signal VT and the force capacitance-excitation signal Vp are time varying signals, such as a sinusoidal wave signal, a square wave signal, a triangular wave signal or a trapezoidal wave signal. The touch capacitance-excitation signal VT and the force capacitance-excitation signal Vp also can be current sources. The counter-exciting signal Vcount is a dc reference signal or a time varying signal with phase opposite to that of the force capacitance-excitation signal Vp. The capacitance sensing circuit is, for example, a self-capacitance sensing circuit. The touch sensing electrodes 160 and the force sensing electrodes are made of transparent conductive material such as indium tin oxide or indium zinc oxide. The touch sensing electrodes 160 and the force sensing electrodes are made of non-transparent conductive material, such as graphite, gold, silver, copper, aluminum, tin, indium, tungsten or molybdenum, or alloy material of any above metals.

Figure 8:
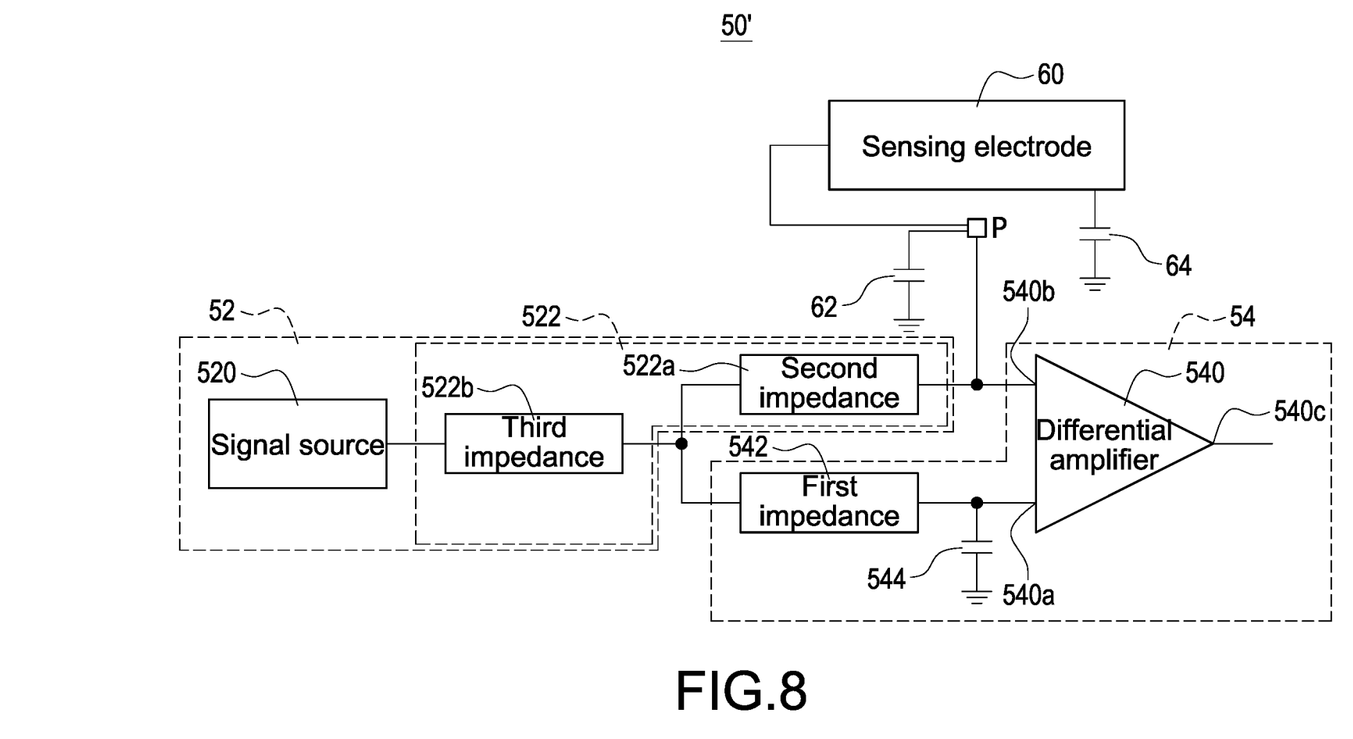
FIG. 8 shows a schematic view of self-capacitance sensing circuit according to an embodiment of the present invention.

FIG. 8 shows the circuit diagram of the self-capacitance sensing circuit 50' according to an embodiment of the present invention. The self-capacitance sensing circuit 50' mainly comprises a capacitance-excitation driving circuit 52 and a capacitance measuring circuit 54 to sense a capacitance change at the sensing point P. The capacitance-excitation driving circuit 52 comprises a signal source 520 and a driving unit 522 (including a second impedance 522*a* and a third impedance 522*b*). The capacitance measuring circuit 54 comprises a differential amplifier 540, a first impedance 542 and a first capacitor 544 and is used to sense a capacitance change at a sensing electrode 60, where the sensing electrode 60 comprises a first stray capacitance 62 and a second stray capacitance 64.

The signal source 520 is electrically coupled with the first impedance 542 and the second impedance 522*a*. The first impedance 542 is electrically coupled with the first capacitor 544 and the first capacitor 544 is electrically coupled with the first input end 540*a* of the differential amplifier 540. The second impedance 522*a* is electrically coupled with the second input end 540*b* of the differential amplifier 540. The sensing electrode 60 is electrically coupled to the second impedance 522*a* and the second input end 540*b* through a node (such as an IC pin) of the self-capacitance sensing circuit 50'. The first stray capacitance 62 is electrically coupled to the node and the second stray capacitance 64 is electrically coupled to the sensing electrode 60.

In the self-capacitance sensing circuit 50' shown in FIG. 8, the sensing electrode 60 receives a touch signal when a finger or a conductor is touched thereon. The signal source 520 is a periodical signal and sent to the third impedance 522, while the resistance values of the first impedance 542 and the second impedance 522*a* are identical. The differential amplifier 540 will generate a differential touch signal after receiving the signal source 520 and the touch signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user finger approaches or touches the sensing electrode 60. Therefore, the voltages fed to the first input end 540*a* and the second input end 540*b* will be different such that the differential amplifier 540 has a (non-zero) differential output at the output end 540*c*. In this way, the minute capacitance change on the sensing electrode 60 can be detected by the differential amplifier 540. Moreover, the noise from circuits or power source can be advantageously removed. The detail of the self-capacitance sensing circuit 50' can be referred to U.S. Pat. No. 8,704,539 (corresponding to Taiwan patent No. 1473001) filed by the same applicant.

Thus, particular embodiments have been described. Other embodiments are within the scope of the following claims. For example, the actions recited in the claims may be performed in a different order and still achieve desirable results.

What is claimed is:

1. A force-touch sensor with multilayered electrodes, the force-touch sensor comprising:
    an upper substrate having a first face and a second face opposite to the first face;
    a first electrode layer arranged on one face of the upper substrate, the first electrode layer having a plurality of first sensing electrodes;
    a second electrode layer arranged opposite to the first electrode layer, and farther away from the upper substrate than the first electrode layer, the second electrode layer having a plurality of second sensing electrodes, each second sensing electrode being corresponding to one of the first sensing electrodes and electrically connected with the corresponding first sensing electrode to form a touch sensing electrode, the plurality of first sensing electrodes and the plurality of second sensing electrodes forming a plurality of touch sensing electrodes;
    a plurality of touch electrode traces, each touch electrode trace electrically connected with one corresponding touch sensing electrode and electrically isolated with other touch sensing electrodes;
    a resilient dielectric layer arranged on a side of the second electrode layer, the side being opposite to the upper substrate, the resilient dielectric layer being compressively deformed under pressure and restoring to original shape and volume if pressure is not present;
    a third electrode layer arranged on a side of the resilient dielectric layer, the side being opposite to the upper substrate, the third electrode layer having at least one force sensing electrode;
    wherein the plurality of touch electrode traces is shielded by the first sensing electrodes or the second sensing electrodes.

2. The force-touch sensor of claim 1, wherein the plurality of touch electrode traces are shielded by both of the first sensing electrodes and the second sensing electrodes.

3. The force-touch sensor of claim 1 further comprising:
    a capacitance sensing circuit sending a touch capacitance-excitation signal to a selected touch sensing electrode sequentially or randomly, and obtaining a touch sensing signal from the touch sensing electrode for performing touch sensing, and sending an auxiliary signal with phase same as that of the touch capacitance-excitation signal to at least one force sensing electrode; the capacitance sensing circuit sending a force capacitance-excitation signal to the at least one force sensing electrode and obtaining a force sensing signal from the force sensing electrode for performing force sensing; the capacitance sensing circuit further sending a counter-exciting signal to the selected touch sensing electrode sequentially or randomly when performing force sensing.

4. The force-touch sensor of claim 3, wherein the capacitance sensing circuit is a self-capacitance sensing circuit.

5. The force-touch sensor of claim 3, wherein the capacitance sensing circuit further sends an auxiliary signal with phase same as that of the touch capacitance-excitation signal to the touch sensing electrodes around the selected touch sensing electrode when performing touch sensing.

6. The force-touch sensor of claim 3, wherein the capacitance sensing circuit further sends a shielding signal with phase same as that of the force capacitance-excitation signal to non-selected touch sensing electrodes when performing force sensing.

7. The force-touch sensor of claim 3, wherein the touch capacitance-excitation signal and the force capacitance-excitation signal are time varying signals or current sources.

8. The force-touch sensor of claim 7, wherein the force counter-exciting signal is a dc reference signal or a time varying signal with phase opposite to that of the force capacitance-excitation signal.

9. The force-touch sensor of claim 8, wherein the dc reference signal is a zero volt signal.

10. The force-touch sensor of claim 1, wherein the upper substrate is a polymer thin film or an ultra-thin glass with thickness no more than 500 μm.

11. The force-touch sensor of claim 1, wherein the upper substrate is a flexible substrate with thickness no more than 500 μm.

12. The force-touch sensor of claim 1 further comprising a lower substrate, wherein the lower substrate is a polymer thin film or glass.

13. The force-touch sensor of claim 1 further comprising an adhesive layer, wherein the adhesive layer is arranged on a side of the third electrode layer opposite to the upper substrate.

14. The force-touch sensor of claim 1, wherein the touch sensing electrodes and force sensing electrodes are made of transparent conductive material.

15. The force-touch sensor of claim 1, wherein the touch sensing electrodes and force sensing electrodes are made of non-transparent conductive material.

\* \* \* \* \*